No. 815,045. PATENTED MAR. 13, 1906.
C. SCHMIDT.
AUTOMOBILE.
APPLICATION FILED OCT. 9, 1905.
3 SHEETS—SHEET 1.
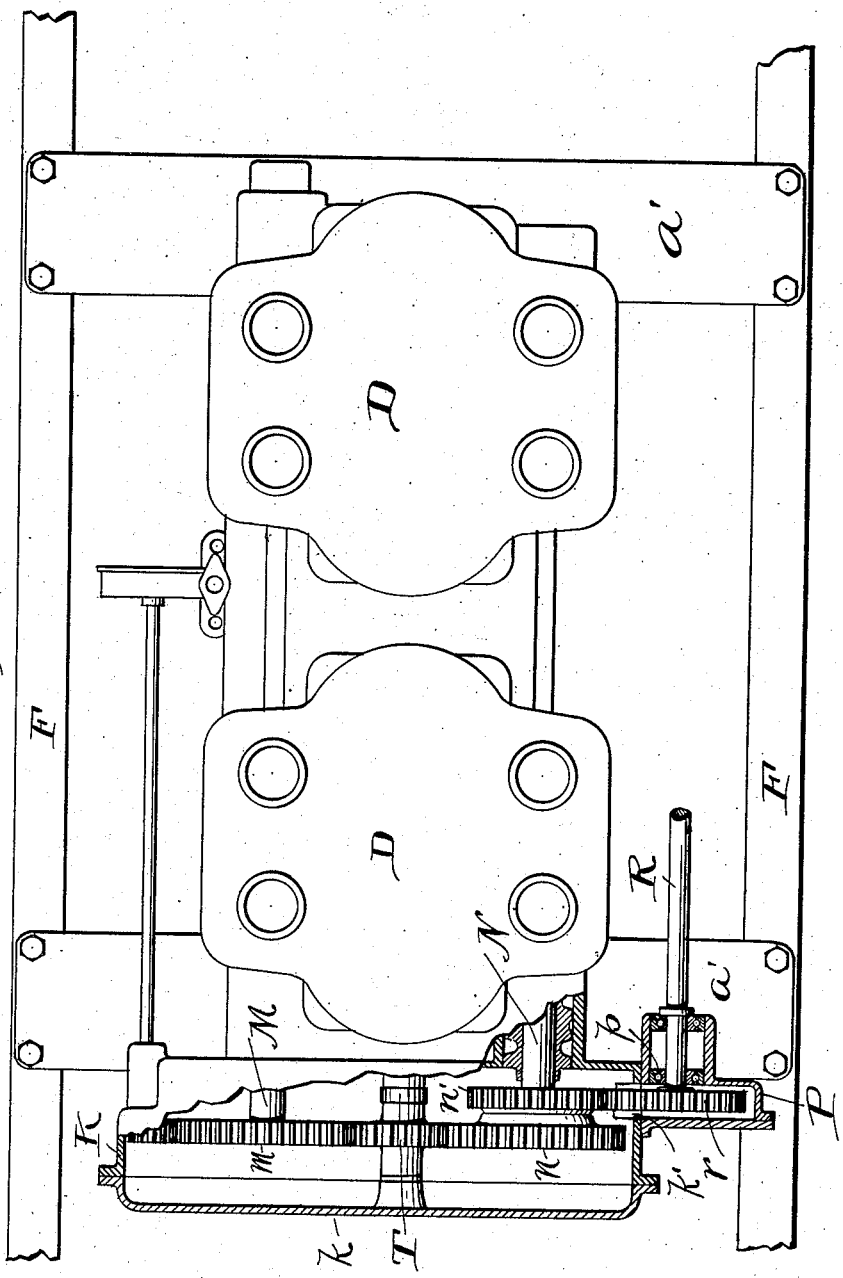
Witnesses
E. B. Gilchrist
H. R. Sullivan
Inventor
Charles Schmidt
By Thurston Bates & Woodward
Attorneys No. 815,045. PATENTED MAR. 13, 1906.
C. SCHMIDT.
AUTOMOBILE.
APPLICATION FILED OCT. 9, 1905.
3 SHEETS—SHEET 2.
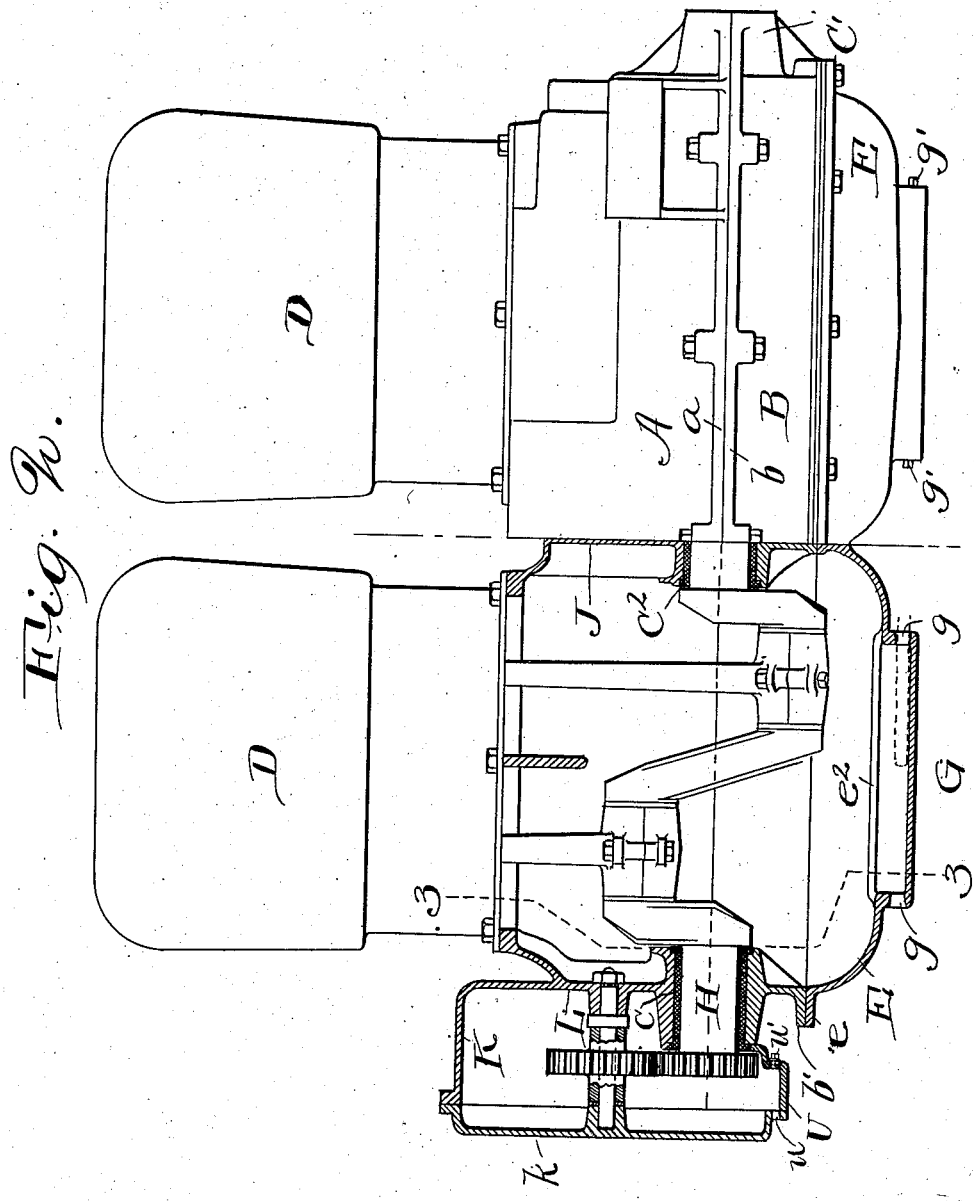
Witnesses
E. B. Gilchrist
H. R. Sullivan
Inventor
Charles Schmidt
By Thurston Bates & Woodward
Attorneys No. 815,045. PATENTED MAR. 13, 1906.
C. SCHMIDT.
AUTOMOBILE.
APPLICATION FILED OCT. 9, 1905.
3 SHEETS—SHEET 3.
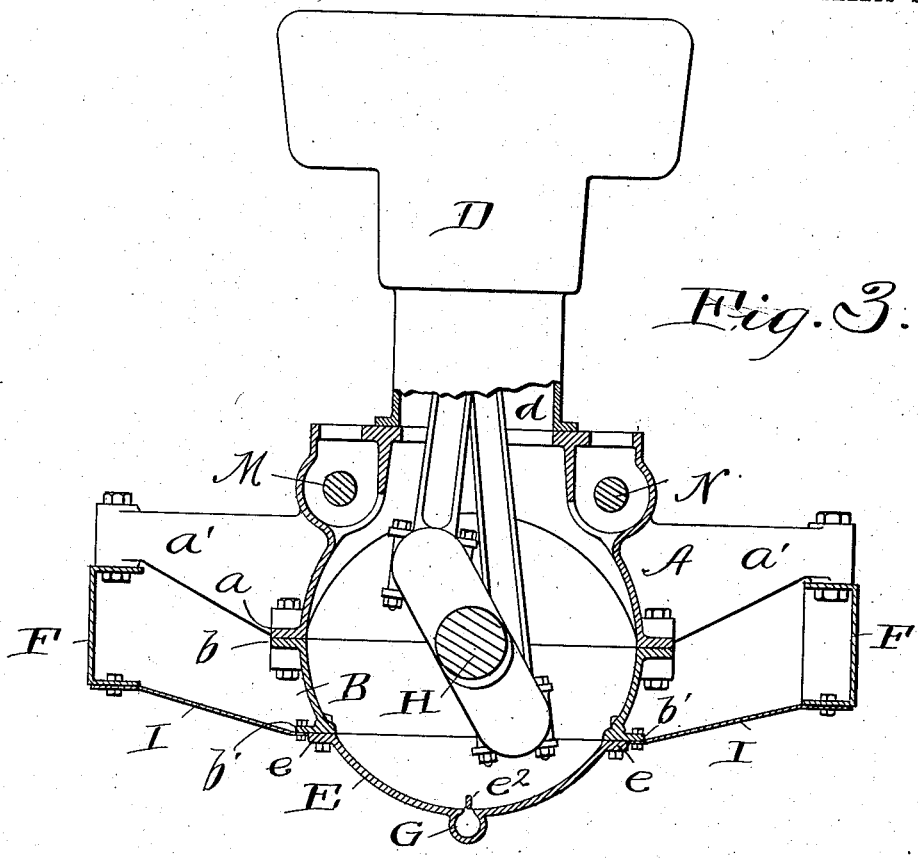
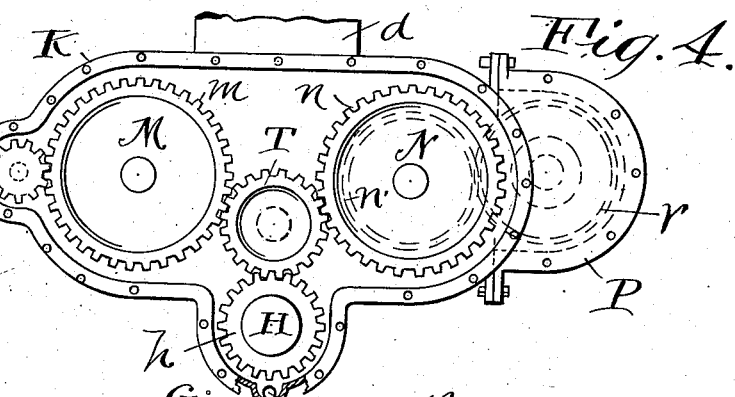
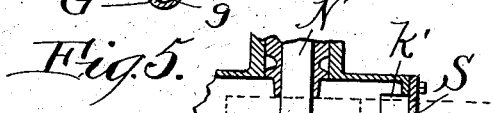
Witnesses.
E. B. Gilchrist
H. R. Sullivan
Inventor
Charles Schmidt
By Thurston Bates & Woodward
Attorneys

UNITED STATES PATENT OFFICE.

CHARLES SCHMIDT, OF CLEVELAND, OHIO, ASSIGNOR TO THE PEERLESS MOTOR CAR COMPANY, OF CLEVELAND, OHIO, A CORPORATION OF WEST VIRGINIA.

AUTOMOBILE.

No. 815,045.        Specification of Letters Patent.       Patented March 13, 1906.

Application filed October 9, 1905. Serial No. 281,881.

*To all whom it may concern:*

Be it known that I, CHARLES SCHMIDT, a citizen of the Republic of France, residing at Cleveland, in the county of Cuyahoga and State of Ohio, have invented a certain new and useful Improvement in Automobiles, of which the following is a full, clear, and exact description, reference being had to the accompanying drawings.

This invention is intended primarily as an improvement in automobiles.

Some of the parts of the invention are useful only as parts of an automobile. Other parts are useful with any inclosed engine, but are of the greatest practical value when used on an automobile, and particularly one employing an explosive-engine.

The invention which is shown in the drawings may be here summarized as the combination of parts hereinafter described, and definitely pointed out in the claims.

In the drawings, Figure 1 is a plan view of the engines, crank-case, and gear-case and those parts of an automobile-frame on which they are supported, the gear-case being shown in horizontal section. Fig. 2 is a side elevation of the crank-case, gear-case, and the engines surmounting the former, the left half of the crank-case and the gear-case being shown in central vertical section. Fig. 3 is a sectional end view in the plane indicated by line 3 3 of Fig. 2. Fig. 4 is an end view of the gear-case when the cap thereof is removed. Fig. 5 is a sectional plan view of the right side of the gear-case when the supplemental casing P is removed and the slot $k'$ in said gear-case is closed by a plate.

The crank-case is for the primary purpose of inclosing and furnishing the bearings for the crank-shaft of the engine. The crank-case shown includes two connected sections A and B, which are separable longitudinally in a horizontal plane passing axially through the crank-shaft and also consequently through the crank-shaft bearings C C' C². The upper halves of these bearings are on the casing-section A and the lower halves on the section B, and the two sections are separably connected by bolts passing through laterally-projecting flanges $a$ and $b$ at their meeting edges.

The castings D D, in which are the engine-cylinders $d$, are secured upon the open top of the upper casing-section A, which section has laterally-projecting arms $a'$, which rest upon and are secured to the side frame members F F of the automobile.

In respect to the features of construction above mentioned the crank-case shown is of familiar form. It is customary, however, for the part B of the case to be of approximately a semicylindrical form and closed at the bottom, so as to be able to hold oil in which the cranks splash as they rotate, so as to lubricate the various bearings. In that common construction it is not possible to get into the crank-case with tools with which to repair or readjust anything therein without removing the lower part of said case, and thereby taking away the lower half of the crank-shaft bearings and leaving said shaft without suitable support for the time being. In the construction shown in the drawings, however, that part B of the crank-case which carries the lower half of the crank-shaft bearings is open and has along its lower edges laterally-projecting flanges $b'$. A third case-section E is provided for closing the bottom of the crank-case. It has laterally-projecting flanges $e$ along its top edge, by means of which bolts can secure it to the lower edge of the section B. If with the described construction it is necessary to get into the crank-case and use tools therein for the purpose of repair or adjustment, only this lower section E has to be removed. This section is dish-shaped and of sufficient capacity to hold all of the oil necessary for the splash lubrication. The removal of this bottom section therefore does not unhang the crank-shaft, nor does it involve either the loss or rehandling of the oil in the crank-case, as it would, for example, if the case were provided in its lower part with a hand-hole and a simple removable cover-plate for normally closing it.

On the bottom of the case-section E there is an integral depending pocket G in open communication with the interior of the crank-case. In the ends of this pocket are holes $g$ $g$, which are alined with the bottom of the pockets and are normally closed by screw-plugs $g'$ $g'$. Sediment or other impurities in the oil will settle in this pocket, from which it can be removed without much loss of oil by removing the plugs and using a plunger-rod, which substantially fits such holes, as indicated by dotted lines in Fig. 2. Directly over the slot through which this pocket communicates with the interior of the case is a longitudinally-extended baffle-bar $e^2$, preferably cast as a part of the section E. This baffle-bar guides some of the impurities and sediment into the pocket. It also prevents any large piece of foreign matter, as metal, which may by accident be left in the crank-case, from being whirled around by the action of the cranks to a place where it might do some damage. The baffle-bar is, however, chiefly valuable in that it prevents the movement of the oil, due to the revolutionary crank very greatly agitating the oil in the pockets and from drawing out of said pockets the sediment which has once settled therein.

The crank-case shown is for use in connection with a four-cylinder engine, each of the castings D containing two cylinders. This necessitates a long crank-shaft H for the four cranks, wherefore it is desirable to have a center bearing for such crank-shafts. Such a bearing $C^2$ is provided in a transverse partition J, formed on the inside of the two casing-sections A and B, which partition serves the additional purpose of separating the crank-casing into two independent chambers. In what I regard as the best construction, as shown in the drawings, each of these crank-chambers has an independent bottom member E. That construction greatly lightens the labor required when one desires to get into one of the crank-chambers only.

In automobiles it is customary to have a dust-shield, usually of sheet metal, extend under the crank-case from one side member of the automobile-frame to the other for the purpose of shielding the engine, &c., from dust. Such a shield, if used, would have to be removed before one could get any benefit from the described construction of the crank-case. I provide an equally efficient dust-shield by making it of two side members I I, which are respectively secured to the side frame members F F and extend therefrom to the laterally-projecting flange $b'$ on the lower edge of the casing-section B. This leaves the bottom sections E free for removal without disturbing the dust-shield.

On one end of the crank-case is an integral gear-case K, which is separated from the crank-case chamber by a partition L. This gear-case is closed by a removable end cap $k$. The crank-shaft projects through its bearing C, which is formed on partition L, into this gear-case, as do also the cam-shafts M and N. Motion is transmitted from the crank-shaft to these cam-shafts through gears $h$ and $m$ and $n$ and an idle gear T.

Many automobile owners prefer to use a magneto for producing the igniting-sparks in the engine-cylinders. Others prefer to use galvanic batteries. In order to satisfy the former, a supplemental gear-case P is secured over a slot $k'$ in one side of the gear-case. This supplemental case carries a bearing $p$ for the magneto-driving shaft R and contains sufficient room to accommodate the gear $r$, secured to said shaft, which gear projects into the gear-case K and meshes with the gear $n'$, secured to the adjacent cam-shaft. If the owner of the automobile prefers to dispense with the magneto, this supplemental casing P may be disconnected from the casing K and it and its associated parts removed. The slot $k'$ may then be closed by a cover-plate S, which is secured to the casing K.

It is to be understood that the gear-case is to contain a quantity of oil into which the crank-shaft gear dips. Therefore it is thought desirable to provide a depending sediment-pocket U, having opposed end holes $u\ u$, which are closed by plugs $u'$.

I claim—

1. In an automobile, the combination with two side frame members, of a crank-case consisting of three longitudinally-separable sections, to wit, the section A having laterally-extended arms which are secured to said side frame members, a bottom dish-shaped section E, and an intermediate section B, the section A being formed with the upper half of the crank-shaft bearings, and section B with the lower half of said bearings.

2. In an automobile, the combination with two side frame members, of a crank-case consisting of three longitudinally-separable sections, to wit, the section A having laterally-extended arms which are secured to said side frame members, a bottom dish-shaped section E, and an intermediate section B, the section A being formed with the upper half of the crank-shaft bearings, and section B with the lower half of said bearings, and the section E having a depending sediment-pocket provided with holes in its ends, and plugs for closing said holes.

3. In an automobile, the combination with two side frame members, of a crank-case consisting of three longitudinally-separable sections, to wit, the section A having laterally-extended arms which are secured to said side frame members, a bottom dish-shaped section E and an intermediate section B, the section A being formed with the upper half of the crank-shaft bearings, and section B with the lower half of said bearings, and the section E having a depending sediment-pocket provided with holes in its ends, and plugs for closing said holes, and a longitudinally-extended baffle-bar fixed in the casing member E over the said pocket.

4. A crank-case consisting of three longitudinally-separable sections, to wit, the upper section A which carries the upper half of the crank-shaft bearings and has an internal partition-piece J which carries the upper half of the middle crank-shaft bearing, and an intermediate section B which carries the lower half of the crank-shaft bearings and has an internal partition-piece J' which carries the lower half of the middle bearing for the crankshaft, which partition-pieces J and J' divide the casing into independent chambers, and two lower dish-shaped sections E which are removably secured to the lower edges of the section B.

5. A crank-case consisting of three longitudinally-separable sections, to wit, the upper section A which carries the upper half of the crank-shaft bearings and has an internal partition-piece J which carries the upper half of the middle crank-shaft bearing, and an intermediate section B which carries the lower half of the crank-shaft bearings and has an internal partition-piece J' which carries the lower half of the middle bearing for the crankshaft, which partition-pieces J and J' divide the casing into independent chambers, and two lower dish-shaped sections E which are removably secured to the lower edges of the section B, and each of said sections E having a dependent pocket which communicates with the interior of the casing and has in its end the holes $g$, $g$, and removable plugs for closing said holes.

6. In an automobile, the combination with two side frame members, of a crank-case consisting of three longitudinally-separable sections, to wit, the section A having laterally-extended arms which are secured to said side frame members, a bottom dish-shaped section E, and an intermediate section B, the section A being formed with the upper half of the crank-shaft bearings, and section B with the lower half of said bearings, and two dust-guard plates secured respectively to the side frame members and to the sides of the casing member B.

7. In an automobile, the combination with two side frame members, of a crank-case consisting of three longitudinally-separable sections, to wit, the section A having laterally-extended arms which are secured to said side frame members, a bottom dish-shaped section E, and an intermediate section B, the section A being formed with the upper half of the crank-shaft bearings, and section B with the lower half of said bearings, and a gear-case formed on one end of said crank-case and having in its side a slot, and a removable cover for said slot.

8. In an automobile, the combination with two side frame members, of a crank-case consisting of three longitudinally-separable sections, to wit, the section A having laterally-extended arms which are secured to said side frame members, a bottom dish-shaped section E and an intermediate section B, the section A being formed with the upper half of the crank-shaft bearings, and section B with the lower half of said bearings, and a gear-case formed on one end of said crank-case and having in its side a slot, and a removable cover for said slot, which cover is in the form of a supplemental casing carrying bearings for a magneto-shaft.

9. In an automobile the combination with two side frame members, of a crank-case consisting of three longitudinally-separable sections, to wit, the section A having laterally-extended arms which are secured to said side frame members, a bottom dish-shaped section E, and an intermediate section B, the section A being formed with the upper half of the crank-shaft bearings, and section B with the lower half of said bearings, and a gear-case formed on one end of said crank-case, which gear-case is provided with a removable end cap.

10. A crank-case consisting of three longitudinally-separable sections, to wit, the section A having laterally-extended arms, a bottom dish-shaped section E, and an intermediate section B, the section A being formed with the upper half of the crank-shaft bearings, and section B with the lower half of said bearings.

11. A crank-case consisting of three longitudinally-separable sections, to wit, the section A having laterally-extended arms, a bottom dish-shaped section E, and an intermediate section B, the section A being formed with the upper half of the crank-shaft bearings, and section B with the lower half of said bearings, and the section E having a depending sediment-pocket provided with holes in its ends, and plugs for closing said holes.

In testimony whereof I hereunto affix my signature in the presence of two witnesses.

CHARLES SCHMIDT.

Witnesses:
ALBERT H. BATES,
E. L. THURSTON.